United States Patent [19]

Siffert et al.

[11] Patent Number: 4,712,423
[45] Date of Patent: Dec. 15, 1987

[54] PROCESS AND APPARATUS FOR MEASURING THE DYNAMIC LOADS APPLIED TO A HIGHWAY BY THE ROAD TRAFFIC

[75] Inventors: Marcel Siffert, Bazainville; Gervais Briant, Le Perray En Yvelines; Pierre Feunten, Elancourt; Honoré Goacolou, Les Clayes/Bois; Jean-Claude Petitgrand, Prunay Sous Ablis; Francois Peyret, Angers, all of France

[73] Assignee: Laboratoire Central Des Ponts Et Chaussees, Paris, France

[21] Appl. No.: 827,770

[22] Filed: Feb. 7, 1986

[51] Int. Cl.[4] ............................................. G01G 19/52
[52] U.S. Cl. ...................................... 73/146; 177/132
[58] Field of Search ........................... 73/146, DIG. 4; 177/132, 210 R, 134

[56] References Cited

U.S. PATENT DOCUMENTS 4,560,016 12/1985 Ibanez et al. ........................ 177/132

FOREIGN PATENT DOCUMENTS 2311928 9/1974 Fed. Rep. of Germany .
2406815 10/1977 France .
2567550 1/1986 France .

OTHER PUBLICATIONS

Electronique Industrielle No. 30, Mar. 15, 1982, pp. 73-75, Paris.

Primary Examiner—Donald O. Woodiel
Attorney, Agent, or Firm—Bell, Seltzer, Park & Gibson

[57] ABSTRACT

This invention relates to a process for measuring the dynamic load exerted on a highway by the axles of the vehicles circulating thereon. Two piezo-electric cables sensitive to the pressure of the axles, furnish, upon passage thereof, a weight information pulse and a speed information pulse, respectively. Signals representing respectively the area of the pulse and the duration of the time gap separating the pulses, are applied to a divider which effects the quotient thereof and furnishes a signal representing the dynamic load.

11 Claims, 4 Drawing Figures

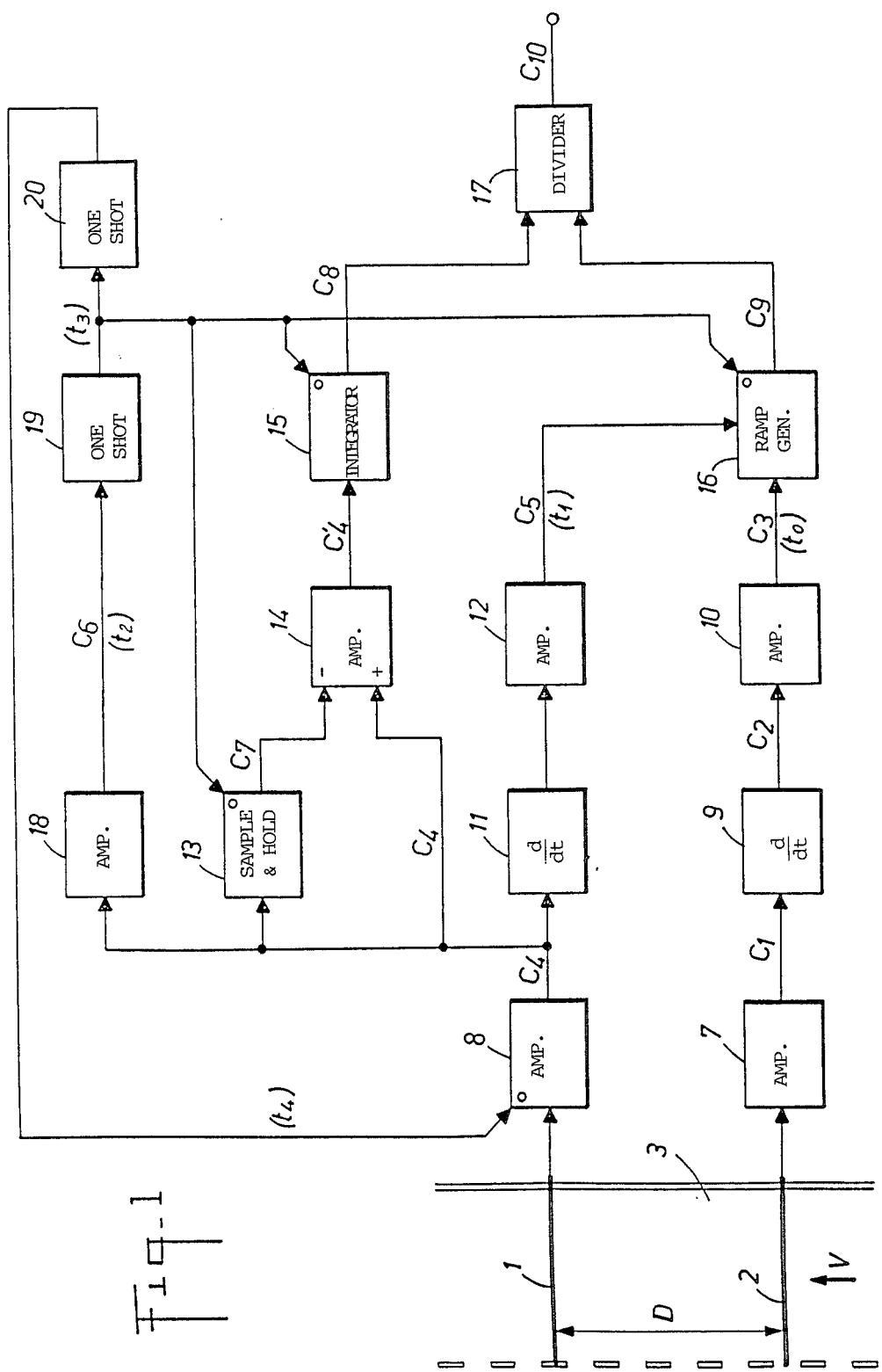

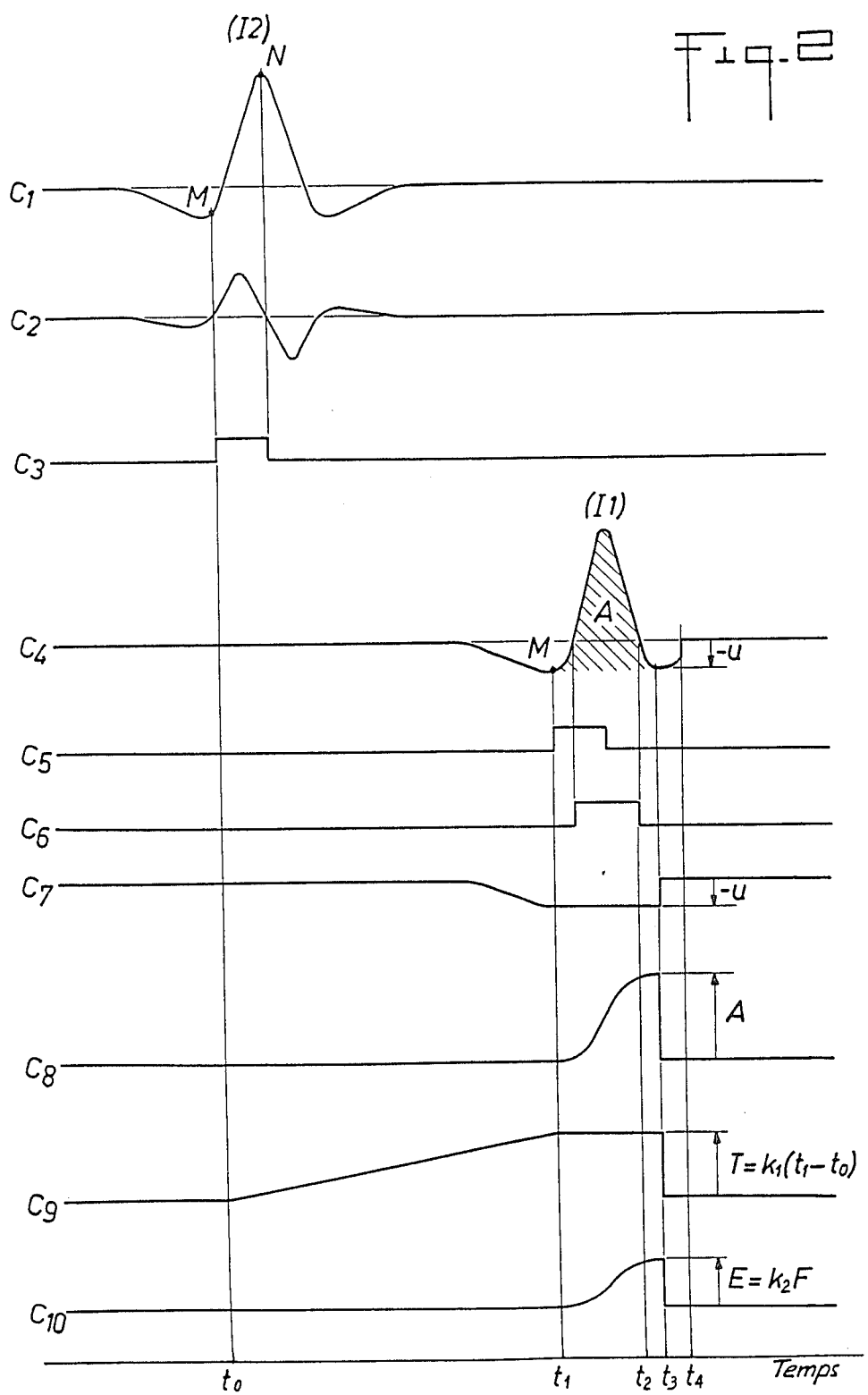

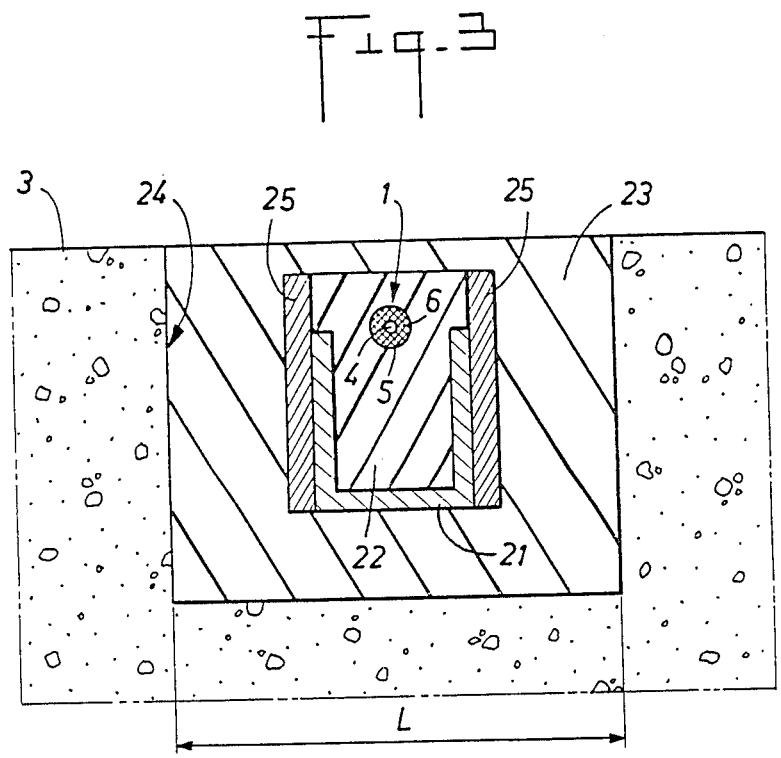
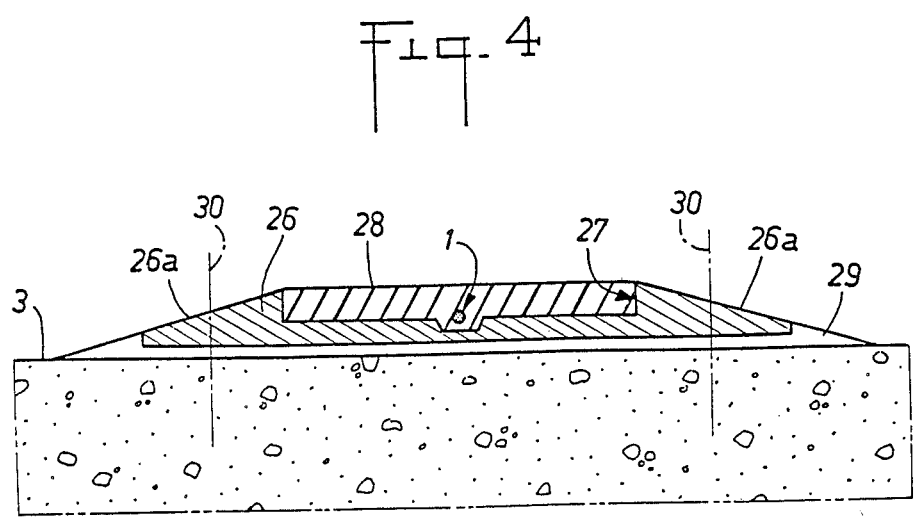

PROCESS AND APPARATUS FOR MEASURING THE DYNAMIC LOADS APPLIED TO A HIGHWAY BY THE ROAD TRAFFIC

The present invention relates to a process for measuring the dynamic loads applied to a highway by the road traffic Knowledge of the loads applied to highways and to civil engineering works (load spectra, rate of overloads, agressiveness of the axles of heavy vehicles) is known to be necessary for correctly dimensioning these works and for maintaining them.

At the present time, dynamic weighing processes are used on highways, employing dynamic weighbridges with piezo-electric quartz, strain gauges, capacitive effect, etc . . . Such equipment is expensive, necessitates considerable installation and maintenance works, is heavy to set to work and imposes relatively long periods of closure of the highway to traffic during these works. It is for this reason that it is not widely distributed.

It is an object of the process according to the invention to overcome these drawbacks.

This process essentially consists in placing across the highway a rectilinear piezo-electric cable so that the wheels of the axles of the vehicles circulating on the highway subject it, upon passage thereof, to a pressure to which it responds by the emission of an electrical pulse, and in calculating the corresponding dynamic load from the parameters of said pulse.

The dynamic load may be deduced very simply from the amplitude of the pulse delivered by the cable, but this is relatively imprecise. Results of better quality are obtained by deducing the dynamic load from the area of the contour of the pulse, with respect to time, and from the speed of the vehicle, by effecting the product of said area by said speed. The value of the area in question is, in fact, proportional to the dynamic load and inversely proportional to the speed of the vehicle. Said speed may be measured with the aid of the pulse delivered by a second rectilinear piezo-electric cable disposed on the highway at a certain distance from the cable mentioned above, by determination of the duration of the time gap separating the appearance of the pulses respectively furnished by the two cables for the same wheel. The distance of cables must therefore be less than the distance of the successive axles of any vehicle circulating on the highway.

The cables may make a non-zero angle (for example 35° to 40°) with each other, or may be disposed parallel to each other. In the first case, at least one of the cables is placed on a bias on the highway and it is possible to effect weighing wheel by wheel and to deduce the lateral location of the vehicle on the highway from the speed and the difference in the times of passage of the left and right wheels of the vehicle over the pair of cables.

Generally, at least one of the cables should be disposed perpendicularly to the longitudinal direction of the highway.

The instant of appearance of each pulse may be defined as being the instant when the signal obtained by derivation of the pulse leaves value zero. As to the area of the pulse, it may be measured by integration with respect to time of the signal constituting the pulse between the instant of its appearance and the instant of its end when this signal resumes the value which it had at the instant of appearance. When the value of the signal constituting the pulse at the instant of its appearance is different from zero, as may result from the deflection of the highway upon passage of the axle, the integration should be directed to the difference between this signal and a signal created with a constant value equal to said non-zero value.

On the other hand, the duration of the time gap separating the appearance of the pulses corresponding to the same wheel may be measured by creating a ramp-shaped signal beginning at the instant of appearance of the pulse emitted by the cable over which the wheel firstly passes and finishing at the instant of appearance of the pulse emitted by the other cable. This latter will generally be the first cable delivering the information on weight, the first-named cable being the second cable delivering the information on speed.

The single cable or at least the first cable is preferably installed so as to be insensitive to the effects of the longitudinal deflections of the highway. Furthermore, said cable is advantageously embedded in a material having a modulus of elasticity insensitive to temperature, filling a long rigid support subjacent the cable. Such a pre-packaging of the cable ensures an independence of the results of measurement with respect to the variations in temperature and reduces the effects of the transverse deflections of the highway. Moreover, it reduces the transverse heterogeneity of the response of the piezo-electric cable to the passage of the load, with respect to that which would be presented by the bare cable.

Said cable support may be a U-section of which the upwardly turned flanges are flanked by strips of material having a very low modulus of elasticity, the whole being embedded in a drain made transversely in the surface layer of the highway and filled with a material having a modulus of elasticity insensitive to temperature. A "drain sensor" is thus produced.

A "surface sensor" may also be produced, by giving the cable support the form of a long flat box, which is placed transversely on the surface layer of the highway and fixed thereto.

In any case, the sensor incorporating the cable which delivers the information on weight must be designed so that the latter receives substantially only the vertical forces translating the load upon passage of an axle, and is subjected the least possible to the influence of the horizontal forces.

The process according to the invention makes it possible to effect weight measurements at costs much less than those involved by the use of weighbridges, the equipment employed being inexpensive and requiring no maintenance. In the event of works on the highway, it is not always necessary to remove and re-install this equipment; if, for example, a thin pavement is subsequently applied, it may prove sufficient to modify the gain of the amplifiers which process the pulses delivered by the cables and to proceed with a fresh calibration to obtain satisfactory operation.

Within the scope of the invention, it may be provided to use not one single pair of cables (a first cable and a second cable), but a plurality of pairs by associating with the same second cable a plurality of first cables, and finding the average of the measurements furnished by these different pairs of cables.

The invention will be more readily understood on reading the following description with reference to the accompanying drawings, in which:

FIG. 1 schematically illustrates an embodiment of the process according to the invention employing two piezo-electric measuring cables and a circuit for processing the signals furnished thereby.

FIG. 2 is a diagram of the different signals appearing in the circuit of FIG. 1.

FIGS. 3 and 4 show in section two embodiments of sensors incorporating a piezo-electric measuring cable.

Referring now to the drawings, and firstly to FIG. 1, two piezo-electric cables 1, 2 are disposed in parallel across one of the traffic lanes of a highway 3, at a distance D of the order of 60 cm, perpendicularly to the longitudinal direction of the highway.

Each of these cables, for example of the type forming the subject matter of French patent No. 70 36004, is a coaxial cable composed (FIG. 3) of a core 4 and a sheath 5, both made of metal, the intermediate space being filled with a piezo-electric material 6 in the form of powder.

When the axle of a vehicle passes over one of these cables 1, 2, this cable undergoes a compression and delivers a pulse (cf. curves C1 and C4 of FIG. 2), of which the characteristics depend on the force of compression and on the speed of the vehicle, therefore on the dynamic load exerted by the axle on the highway.

The first cable 1 thus delivers, upon passage of a vehicle axle, a pulse I1 intended to furnish information relative to the weight. The second cable 2, placed upstream of cable 1 in the direction of traffic indicated by arrow V, similarly delivers a pulse I2 intended to furnish information relative to the speed of the axle.

These pulses, of which the essential part corresponds to a positive electric voltage, are surrounded by two zones of negative voltage, due to the tensile stresses exerted by the axle on the surface layer of the highway. The instant when each pulse actually starts is that of point M where the voltage having become negative begins to increase up to the highest point N of the pulse. This instant is determined as being the one when the signal obtained by derivation of the pulse leaves the value zero, or, more exactly, passes this value after having been slightly negative (cf. curve C2 of FIG. 2).

Cables 1, 2 are connected to amplifiers 7, 8 presenting a high input impedance in order to allow correct measurements even for vehicles circulating at low speed. These amplifiers deliver signals C1 and C4 corresponding respectively to pulses I2 and I1. The amplifier 7 of cable 2 is followed by a derivative circuit element 9 delivering signal C2, which is applied to a threshold amplifier 10. The threshold value being close to zero, this latter amplifier delivers a rectangular pulse C3 of which the leading edge corresponds to the instant to of appearance of pulse C1.

Similarly, amplifier 8 to which cable 1 is connected is followed by a derivative circuit element 11 and a threshold amplifier 12 which delivers the rectangular pulse C5 of which the leading edge corresponds to instant t1 of appearance of pulse C4, later than instant to, as cable 1 lies downstream of cable 2 in the direction of traffic indicated by arrow V.

The area A of pulse C4 (hatched in FIG. 2) is proportional to the force F exerted by the axle on cable 1 (dynamic load of the axle) inversely proportional to speed V of said axle:

$$A = k\,F/V.$$

Therefore:

$$F = k'AV.$$

Now, $$V = D/(t1 - t0).$$

Hence $$F = k''A/(t1 - t0).$$

In accordance with this latter formula, F will be calculated from the values of area A and time t1 − t0, which must therefore be determined.

Being given that the beginning and end of pulse C4 correspond to a negative level −u of voltage, a correction signal C7 is formed which presents a level of voltage −u for the whole duration of the pulse, then this signal is subtracted from signal C4. The entirely positive pulse resulting therefrom may then be easily integrated with respect to time in order to obtain area A.

Signal C7 is produced by a sampler and hold unit 13 which receives signal C4 and ensures load of a capacitor to the progressively decreasing value which the signal C4 takes before the pulse proper, this capacitor then conserving the voltage −u finally acquired. This signal C7 is subtracted from signal C4 in a circuit element 14 and the resulting signal C'4 (not shown in FIG. 2) is applied to an integrator 15 which delivers a signal C8 of which the terminal amplitude is representative of area A.

The time gap t1 − t0 is determined by applying the signals C3 and C5 to a ramp generator 16 so that the latter generates a ramp-shaped signal C9, increasing linearly from instant to to instant t1, thereafter remaining constant at the value T attained at instant t1, which is proportional to the value of the time gap t1 − to:

$$T = k1(t1 - to).$$

Finally, the signals C8 and C9, representing area A and time t1 − t0 respectively, are applied to a divider circuit 17 which effects the quotient thereof and consequently furnishes a signal C10 of which the terminal value E is proportional to the dynamic load F which must be determined.

The circuit of FIG. 1 further comprises a threshold amplifier 18 which furnishes, from the pulse constituting the signal C4, a rectangular pulse C6 beginning and ending at the instants when the pulse C4 passes through zero level. From the terminal instant t2 of the pulse C6, a first monostable multivibrator 19 is triggered, which creates an instant t3 where a short pulse for return to zero of signals C7, C8 and C9, and consequently of signal C10, is formed. The time gap t3 − t2 is therefore the one during which the amplitude E of signal C10 is measured. Its duration results from a compromise: it must be sufficiently long to allow a comfortable measurement of said amplitude E, without being prolonged to the point of there being a risk of encroachment of a measuring cycle relative to one axle of a vehicle and of the measuring cycle relative to another axle of the same vehicle, circulating at high speed. An order of magnitude suitable for this time gap is 1/30th of a second.

After instant t3, an instant t4 is created by a second monostable multivibrator 20, the time gaps t4 − t3 and t3 − t2 being substantially equal. At this instant t4 there is formed a short pulse which ensures unloading of cable 1, which is manifested by the return to zero of signal C4. Such an operation is unnecessary for cable 2 which has only to furnish "all or nothing" information for determining the speed of displacement of the vehicles. Instant t4 marks the end of the process for measuring the dynamic load of an axle.

Two embodiments of installation of cable 1 are illustrated by way of example in FIGS. 3 and 4. This cable must generally be protected from the effects of the longitudinal and transverse deflections and from variations in temperature of which the highway 3 may be the seat. For its part, cable 2, merely furnishing information on speed, may be implanted more simply.

In FIG. 3, cable 1 is associated with a rigid, rectilinear U-section 21 which it surmounts longitudinally and to which it is connected by a coating material 22 with a modulus of elasticity insensitive to temperature. The U-section 21, which presents a general cross section which is substantially square, may be made of a metal such as aluminium. A rigid packaging assembly of the cable 1 is thus obtained, which is embedded in a material 23 which may be of the same nature as material 22, filling a drain 24 made transversely in the surface layer of the highway 3. This drain presents a width L of, for example, between 5 and 8 cm, sufficient to render negligible the incidence of the possible variations of the modulus of elasticity of the material constituting the surface layer. Along the outer sides of the upwardly facing flanges of section 21, and of the mass of material 22 which projects therefrom, there are provided strips 25 of material with a very low modulus of elasticity (for example elastomer foam) which procure an effect of mechanical filtering which attenuates the influence of the longitudinal deflections of the highway, that of the transverse deflections being contained by the rigid section 21. The filling materials 22, 23 may be constituted by a silica epoxy mortar, of which the modulus of elasticity does not vary by more than 20 to 25% within the temperature range of from $-10°$ C. to $+50°$ C.

Elements 1, 21, 22 and 25 may be assembled in the factory. In the assembly obtained, cable 1 is of constant dimensions well determined with respect to section 21, and the rigidity of this assembly enables it to be installed in the drain easily and in reproducible manner.

Instead of using a drain sensor as shown in FIG. 3, a surface sensor may sometimes be preferred. FIG. 4 shows such an embodiment. A flat box 26, of height less than about 1 cm and of width which may attain about 15 cm, serves as support for cable 1, which is placed at the centre of a wide groove 27 provided in the box over its whole length. Groove 27 is completely filled with a coating material 28 of the same type as materials 22 and 23 of the drain sensor of FIG. 3. The box 26 which comprises on its two longitudinal edges bevels forming access ramps 26a intended for attenuating the shaking inflicted by the sensor on the vehicles, is fixed to the surface of the highway 3, transversely to the longitudinal direction thereof, by adhesion with the aid of an adhesive material 29, and possibly by complementary fixing means 30 (concrete screws and bolts, for example).

Elements 1, 26 and 28 are preferably assembled in the factory. The structure of the assembly thus constituted ensures a very low transverse heterogeneity, close to that of cable 1, as well as a zero incidence both of the longitudinal deflections of the surface layer of the highway 3 and of the variations in modulus of elasticity between the latter and the sensor.

What is claimed is:

1. A process for measuring the dynamic loads applied to a highway by the road traffic, in which a rectilinear piezo-electric cable is placed across the highway so that the wheels of the axles of the vehicles circulating on the highway subject it, upon passage thereof, to a pressure to which it responds by the emission of an electrical pulse and the corresponding dynamic load is calculated from the parameters of said pulse, whilst the speed of the vehicle is measured with the aid of the pulse delivered by a second rectilinear piezo-electric cable disposed on the highway at a certain distance from the first-mentioned cable, by determination of the duration of the time gap separating the appearance of the pulses respectively furnished by the two cables for the same wheel, the dynamic load being deduced from the area of the contour, with respect to time, of the pulse delivered by the first-mentioned cable and from the speed of the vehicle, by making the product of said area by said speed.

2. The process of claim 1, wherein the area of the pulse is measured by integration with respect to time of the signal constituting the pulse between the instant of its appearance and the instant of its end when this signal resumes the value which it had at the instant of appearance.

3. The process of claim 2, wherein, when the value of the signal constituting the pulse at the instant of its appearance is different from zero, the integration is directed to the difference between this signal and a signal created with a constant value equal to said non-zero value.

4. The process of claim 1, wherein the instant of appearance of each pulse is determined by detecting the instant when the signal obtained by derivation of the pulse leaves the value zero.

5. The process of claim 1, wherein the duration of the time gap separating the appearance of the pulses corresponding to the same wheel is measured by creating a ramp-shaped signal beginning at the instant of appearance of the pulse emitted by the cable over which the wheel firstly passes and ending at the instant of appearance of the pulse emitted by the other cable, the latter being disposed downstream in the direction of circulation of the vehicles.

6. The process of claim 1, wherein the cables make a non-zero angle with each other.

7. The process of claim 1, wherein the cables are disposed parallel to each other.

8. The process of claim 6 or 7, wherein at least one of the cables is disposed perpendicularly to the longitudinal direction of the highway.

9. A sensor for measuring the dynamic loads applied to a highway by the road traffic, comprising a rectilinear piezo-electric cable adapted to be placed across the highway so that the wheels of the axles of the vehicles circulating on the highway subject the cable, upon passage thereof, to a pressure to which it responds by the emission of an electrical pulse, said sensor comprising a piezo-electric cable;
a long rigid support subjacent the cable; and
a material having a modulus of elasticity insensitive to temperature, the material being disposed within the support and encasing and supporting the cable, so that the cable is insensitive to the effects of the longitudinal deflections of the highway.

10. The sensor of claim 9, wherein said said sensor further comprises a casing surrounding the support along its length, the casing being of a material having a low modulus of elasticity and being insensitive to temperature; and said sensor further comprises a U-shaped section having upwardly facing flanges, and strips flanking the exterior portion of the flanges, the strips being of a low modulus of elasticity and being insensitive to longitudinal deflections of the highway, said casing and encased sensor adapter for being embedded inside a drain made transversely in the surface layer of the highway.

11. The sensor of claim 9, wherein said support is a long flat box placed transversely on the surface layer of the highway and fixed thereto.

* * * * *